(12) United States Patent
Sosa Bravo (10) Patent No.: US 9,242,398 B2
(45) Date of Patent: Jan. 26, 2016

(54) PROCESS FOR PRODUCING MOLDED PLASTIC ARTICLES HAVING REINFORCED WALLS, THROUGH FOAMED THERMOPLASTIC INJECTION

(76) Inventor: Sergio Sosa Bravo, Coyoacan (MX)

( * ) Notice: Subject to any disclaimer, the term of this patent is extended or adjusted under 35 U.S.C. 154(b) by 321 days.

(21) Appl. No.: 13/000,207

(22) PCT Filed: Jul. 15, 2008

(86) PCT No.: PCT/MX2008/000090
§ 371 (c)(1),
(2), (4) Date: Feb. 15, 2011

(87) PCT Pub. No.: WO2010/008264
PCT Pub. Date: Jan. 21, 2010

(65) Prior Publication Data
US 2011/0148010 A1 Jun. 23, 2011

(51) Int. Cl.
| | | |
|---|---|---|
| B29C 67/00 | (2006.01) | |
| B29C 44/18 | (2006.01) | |
| B29C 45/00 | (2006.01) | |
| B29C 45/14 | (2006.01) | |
| B29C 44/02 | (2006.01) | |
| B29C 44/08 | (2006.01) | |

(52) U.S. Cl.
CPC ............. *B29C 44/18* (2013.01); *B29C 44/027* (2013.01); *B29C 44/08* (2013.01); *B29C 45/0062* (2013.01); *B29C 45/14344* (2013.01); *B29C 45/14467* (2013.01)

(58) Field of Classification Search
CPC   B29C 44/18; B29C 44/1228; B29C 44/1233; B29C 44/1238; B29C 45/0062; B29C 45/14344

USPC ............. 264/46.6, 45.1, 46.5, 46.7, 267, 478, 264/645, 297.2, 45.4
See application file for complete search history.

(56) References Cited

U.S. PATENT DOCUMENTS

| | | |
|---|---|---|
| 3,468,990 A | 9/1969 | Odel |
| 3,832,955 A | 9/1974 | Pottinger et al. |
| 4,051,784 A | 10/1977 | Ries |
| 4,259,274 A | 3/1981 | Tiitola |
| 4,316,419 A | 2/1982 | Cupido |
| 4,397,998 A * | 8/1983 | De La Mare et al. ...... 525/420.5 |
| 4,597,338 A | 7/1986 | Kreeger |
| 5,046,434 A | 9/1991 | Breezer et al. |

(Continued)

FOREIGN PATENT DOCUMENTS

| | | |
|---|---|---|
| DE | 19745122 A1 | 4/1999 |
| DE | 19751236 A1 | 6/1999 |

(Continued)

*Primary Examiner* — Stella Yi
(74) *Attorney, Agent, or Firm* — The Webb Law Firm (57) ABSTRACT

The present invention relates to a hybrid process for producing molded plastic articles by reinforcing the walls thereof through the injection of a foamed thermoplastic material, thus increasing the thickness of the wall in previously determined zones in order to improve the mechanical characteristics thereof. According to the invention, said hybrid process comprises to strengthen previously defined zones of the plastic articles formed by any of the already known processes, such as: injection, extrusion, extrusion-blowing, injection-blowing, thermoforming, roto-molding, or any combination thereof; and afterwards the injection of a foamable thermoplastic material to fill up said strengthening predesigned zones.

18 Claims, 10 Drawing Sheets

(56) References Cited

U.S. PATENT DOCUMENTS

| | | |
|---|---|---|
| 5,186,777 A | 2/1993 | Perenon et al. |
| 5,417,167 A | 5/1995 | Sadr |
| 5,483,899 A | 1/1996 | Christie |
| 5,700,050 A | 12/1997 | Gonas |
| 5,744,077 A | 4/1998 | Grisch et al. |
| 6,006,677 A | 12/1999 | Apps et al. |
| 6,029,583 A | 2/2000 | LeTrudet |
| 6,093,358 A | 7/2000 | Schiewe et al. |
| 6,103,348 A | 8/2000 | Scharrenberg et al. |
| 6,199,488 B1 | 3/2001 | Favaron et al. |
| 6,295,787 B1 | 10/2001 | Lee |
| 6,378,933 B1 | 4/2002 | Schoen et al. |
| 6,406,078 B1 | 6/2002 | Wycech |
| 6,422,575 B1 | 7/2002 | Czaplicki et al. |
| 6,423,755 B1 | 7/2002 | Allen et al. |
| 6,451,231 B1 | 9/2002 | Harrison et al. |
| 6,619,727 B1 | 9/2003 | Barz et al. |
| 6,705,237 B2 | 3/2004 | Moore, Jr. et al. |
| 6,938,558 B1 | 9/2005 | Peres |
| 6,976,437 B2 | 12/2005 | Fisch et al. |
| 7,168,590 B2 | 1/2007 | Jones et al. |
| 2002/0074827 A1 | 6/2002 | Fitzgerald et al. |
| 2003/0137162 A1 | 7/2003 | Kropfeld |
| 2003/0184121 A1* | 10/2003 | Czaplicki et al. ........ 296/187.02 |
| 2003/0209921 A1 | 11/2003 | Coon et al. |
| 2004/0229013 A1* | 11/2004 | Dooley et al. ................. 428/138 |
| 2004/0255546 A1 | 12/2004 | Sophiea et al. |
| 2006/0154028 A1* | 7/2006 | Dooley et al. ................. 428/138 |
| 2006/0236903 A1 | 10/2006 | Moore, Jr. |
| 2006/0249058 A1 | 11/2006 | Moore, Jr. et al. |
| 2007/0023945 A1 | 2/2007 | Valentinsson |
| 2007/0028814 A1 | 2/2007 | Swistak et al. |
| 2007/0166529 A1 | 7/2007 | Hsu |
| 2007/0176480 A1 | 8/2007 | Brunner |
| 2007/0234933 A1 | 10/2007 | Donnell, Jr. et al. |
| 2007/0275229 A1 | 11/2007 | Laws et al. |
| 2008/0113056 A1* | 5/2008 | Schnurr ....................... 425/162 |

FOREIGN PATENT DOCUMENTS

| | | |
|---|---|---|
| DE | 10041970 A1 | 3/2002 |
| EP | 0647513 A2 | 4/1995 |
| EP | 0925895 A1 | 6/1999 |
| ES | 454107 A1 | 2/1978 |
| ES | 2177070 T3 | 12/2002 |
| FR | 2697801 A1 | 5/1994 |
| GB | 1335688 | 10/1973 |
| GB | 2434530 A | 8/2007 |
| JP | 2000309059 A | 11/2000 |
| WO | 02074843 A2 | 9/2002 |

* cited by examiner

PROCESS FOR PRODUCING MOLDED PLASTIC ARTICLES HAVING REINFORCED WALLS, THROUGH FOAMED THERMOPLASTIC INJECTION

FIELD OF THE INVENTION

This invention relates to molding processes in plastic industry and relates specifically to a hybrid process enabling to reinforce predetermined zones in plastic articles, in order to increase the wall thickness and, accordingly, the mechanical characteristics thereof.

BACKGROUND OF THE INVENTION

The broadest known process in plastic industry, employed in the manufacture of articles is the "injection" molding. Said process was first known in 40's decade and in present times a great number of variations are known, related to the type of products to be manufactured and the materials employed in their manufacture. Therefore, a number of specialized machinery has been designed to inject every type of plastic (thermoplastic and thermoset), rigid and flexible, usable in several applications and with several geometric shapes and also with different wall thicknesses.

In all cases, the "injection" molding processes, as well as other plastic molding processes are aimed to satisfy specific needs, based on the application of the molded product, with lowest possible costs, by developing an optimal application to comply with the specifications while reducing costs and manufacture or molding times.

In this connection, the wall thickness in a plastic product to be manufactured is one of the most important items to take into account in a molding process, since a lower wall thickness evidently implies a lower weight and therefore lower costs. Also a lower wall thickness requires lesser manufacture times as a shorter cycle will be required which means lower production costs. The opposite is also true: A greater wall thickness implies greater weight and greater costs as well as also greater manufacture times as a longer cycle will be required.

Wall thicknesses traditionally used in an "injection" molding process range between 0.5 mm and 3.0 mm. There are also special applications requiring of "thin walls" of less than 0.5 mm, for the manufacture of which specially designed machinery is needed. On the other side, there are also applications with walls of more than 3.0 mm; but in this case grave problems can be experienced as sink marks and deformations may be formed in the molded part; but normally can be reached wall thicknesses of up to 4.0/5.0 mm.

A so-called "structural foam injection" process has been developed for those molded parts having wall thicknesses greater than 5.0 mm, wherein a plastic material is injected inside the mold together with a foaming or expanding agent which, upon reacting, makes possible to maintain an inner mold pressure that prevents the formation of sink marks and deformations in the product. With this process, parts with a thickness greater than 10 mm or more can be injected without sink marks and deformations. However, the molding times are considerably increased since the cooling time within the mold must be enough to cool down said thickness.

Providers of machinery for the "structural foam injection" process have developed machines having a number of clamping units so that, while a mold is being cooled down, another part may be injected, thus increasing the productiveness of the process. However, a drawback is inherent in said machines: they are highly costly and a number of molds are required in order to carry out this process.

Accordingly, in present times, after great developments in the manufacture of machinery and equipment to inject plastics, two well known processes of public dominion can be found:

1. High-pressure injection, the traditional injection process, wherein parts with wall thickness of up to 4.0/5.0 mm are molded.

2. Low-pressure injection, also known as structural foam injection, wherein parts with wall thickness of more than 6.0 mm are molded.

In order to clear the applicability and the difference between both processes, an example will be given about the manufacture of a school desk paddle-board.

Example Comparing Conventional High and Low Pressure Injection Processes

Traditionally a school desk paddle-board is made of wood; however, for illustrative purposes, a production exercise of a plastic paddle-board is carried out. In this exercise a high pressure injection process was employed for a design having a 3 mm wall thickness, provided with enough ribs to resist the pressure with which a person leans on a paddle-board during the writing operation.

Although the design employed was suitable, the following problems were detected:

1. The paddle-board rigidity was not sufficient to resist the pressure of a person while leaning during the writing operation thereon, exhibiting deflection where no lower support was present.

2. Weakness and easy fractures were present in the hubs provided to screw the paddle-board to the school desk.

3. Small lines (sink marks) are marked on the paddle-board surface exactly on the portion contrary to the position of the ribs and mainly wherein the connection hubs were present; with the result of a low quality appearance.

4. During the high-pressure injection process, when the paddle-board was very fast subjected to ejected, deformed and lost plainness was found; therefore, the cycle must be large (90 sec) and, when withdrawn from the machine, it was necessary to submerge the piece in cold water and force the plainness thereof by means of a gage.

5. For all of the above, said paddle-board does not satisfy the needs of the product, since it was of low quality and high cost.

The solution proposed for these problems was to shift the molding process from a high-pressure injection process, to a low-pressure injection process.

This latter process was proved by manufacturing a paddle-board of the same thickness as the wooden paddle-board (10 mm) and due to the process and to the structural foam, resulted in that:

1. The rigidity of the paddle-board was similar to that of the wooden paddle-board, without flexures under normal leaning pressures.

2. Said paddle-board could be screwed to the school desk with same easy as a wooden paddle-board, and no fractures were detected.

3. The surface of the paddle-board was perfect and no brightening nor varnishing were necessary since upon withdrawing from the machine it was ready; when the injection was carried out with a bicomponent, a high quality aspect was obtained.

4. However, in the low-pressure injection process said paddle-board was ejected with a cycle longer than the previous process (180 sec); however, the hourly production was greater due to the fact that the machine was provided with a number of cooling stations and, additionally, the paddleboard was ready when leaving the machine, and no secondary process was required.

5. Therefore, said paddle-board complied with the requirements of the product, was a high-quality product and the cost thereof was lower.

In spite of the above, no shift could be made from one process to another, since the machine to inject said structural foam represented a very high investment and the annual volume of paddle-boards demand was not sufficient to return said investment.

In the above example the usually found problems can be seen when plastic parts or products need to be manufactured with great wall thicknesses, for applications in which they are permanently subjected to different strains; said problems are not exclusive of the injection processes, but also are present in an:

Extrusion process;
Extrusion-blowing process;
Injection-blowing process;
Thermoforming processes;
Roto-molding processes;
Other processes.

Various developments have been effected in order to provide processes enabling the molding of parts or products with great wall thicknesses. For instance, the Valentinsson U.S. Patent Application No. 2007/0023945 A1, disclosing a "process for the manufacture of an article made from plastic material", wherein said article comprises a foamed plastic core with an average specific gravity of from about 50 to 650 $kg/m^3$ and a solid or semi-solid skin with an average specific gravity of about 700 $kg/m^3$. Said process is such that, in a first stage, a melted material with a foaming agent is injected within a closed mold; the solidification of said material is permitted to form the skin and then a portion of the mold is retracted in order to lower the pressure and allow for the expansion of the material in those portions in which said mold has been retracted; then the cooling and solidification of the material is provided in order to, finally, withdraw said article from the mold. It is clear that, said process is slow in production time, as the cooling of the material is required in the first stage of the skin formation and then for the finishing, said product must be released from the mold until it has become completely cold and solidified. Furthermore, said process requires a mobile sections mold in those portions of the article in which a greater thickness is desired. Therefore, the conditions necessary to apply the claims of said invention determine that said method is in a clear disadvantage due to the high operation costs and, at the same time, the periods of time to carry out said process are elongated, what means excessive expenses.

On the other side, U.S. Pat. No. 6,422,575 (Czaplicki et al, 2002) describes a highly interesting method of reinforcing hollow structures upon inserting within the same an expansible preform the walls of which must conform to the hole to be filled, and wherein said preform is constituted by an expansible core contained within a skin encapsulating the same. When the expansion of the preform inserted within said space to be filled is carried out, said skin expands coordinately with the core, in such a manner that, after a certain period of time, said skin adheres to the surfaces of the walls defining the hole being filled. In this instance, said hollow article has been previously produced and the stiffener with said expansible material is formed afterwards, so that the method offers advantages compared to the previously described alternative.

A great disadvantage is that said preform must be designed specifically to conform to the inner walls of the hole and the materials are to be of such a nature that said expansion is coordinated between the adhesive skin and the refill core. Due to these particularities necessary for the application of the method claimed in said invention, said method suffers of the disadvantages of being costly and with scarce advantages relating the manufacture times.

U.S. patent applications Nos. 2003/0184121 and 2003/0209921 by the same inventor of the patent cited in the previous paragraph, are directed to a system and a method to reinforce a structural member including at least a hollow support with an outer skin and an inner portion or chamber or compartment and cover to a greater detail applications of the expansible preform concept, and provide that the core expansible material can be a pumpable polymeric material, a material expansible by heat or a self-hardening material; and that the compartment or chamber (said preform) can be made from a polymeric material, such as nylon, that can be solid, blowing-molded, flexible or expansible, according to the character of the structural member being reinforced.

Certain modifications to the Czaplicki general concept are, for instance, those described in a U.S. Patent Application No. 2003/0137162 (Kropfeld, 2003), wherein there is proposed the use of an expansible foaming reinforcing member to strengthen a hollow structural member, including an expansible reinforce material based on resin, joined to a support that maintains said reinforcing member in a suitable site until the thermal expansion. This is applicable, for instance, in the automobile field, with a reinforcing member such as a polyurethane foam (thermosetting plastic) when an insert with a containment partition is inserted into a portion of the structural member; which, combined with the walls of the element being strengthened, constitutes a containing zone for said reinforce material; thus, said non hardened reinforce material is injected into said zone and hardens therein. The advantage of this alternative, compared to Czaplicki's is that there is no the requirement for a preform to adapt to said zone of the structural element being strengthened; however, the insertion of the containment partitions constitutes a questionable item.

Technically, the application field for all of the above described patents is constricted to very specific cases that require of determined different conditions for their suitable applicability; moreover, they represent high investments regarding the material necessary for their production, not to mention that they require of prolonged manufacture times.

An interesting alternative to the strengthening of molded pieces is offered in the U.S. Pat. No. 6,093,358 (Schiewe et al, 2000), wherein a method is disclosed of forming an expansible product for the refilling of spaces in previously formed articles, wherein a formed plastic supporting structure is included with at least an opening and an expansible material; said method consisting in preparing said plastic supporting structure to be coated afterwards with an expansible plastic material; said support can be molded in the manner of a net with a plurality of openings in order that said foamed product is suitably adhered thereto. Said expansible material is a conventional rubber that expanses by means of heat to fill up a space. In this invention, as well as in the above referred to inventions, high production times are employed, and the production costs are also high with this type of product.

In U.S. Patent Application No. 2002/0074827, Fitzgerald proposes the use of an expansible foam stiffener fastened to a carrier that maintains said stiffener in a desired position; said expansible material is selected so that its expansion temperature be similar to that obtained in any stage of the manufacture process of the piece being reinforced (for instance, the paint baking temperature in an automobile piece) and said material comprises a plurality of separate apart wings or ribs, in such a manner that hot air may flow there through, thus effecting said expansion. Said ribs can be so shaped as to follow the sectional shape of the cavity in the structural member being strengthened; thus enabling that said stiffener member can be inserted within small cavities, even with irregular shapes. That invention shows an application different from the contents of the present invention, as the former is directed exclusively to automobile industry and one of the technical problems observed therein is that an oven temperature must be maintained for the paint of said material, and said material contains a series of wings or ribs, which implies a greater amount of material and cooling time; that is, also means a greater investment and a greater production time.

An embodiment of this concept is presented by Barz in U.S. Pat. No. 6,619,727, wherein the proposed stiffener is made from an expansible material, an epoxy resin (thermosetting plastic) that, in this case, is placed in a skeleton member offering a plurality of holes, in such a manner that once said skeleton member is inserted into the structural member (framework) being strengthened, said expansible material hardens when said assembly passes through a specific assembling process. Thus a reinforcement is obtained with a load distribution onto the frame of the vehicle without adding an excessive weight. A variation for the reinforcement of hollow poles in the automobile field is offered by the U.S. Pat. No. 6,378,933 (Schoen et al, 2002), wherein the employment of a three-dimensional core is described, located at the center of a hollow pole and then is encircled with a rigid foam, thus obtaining a greater stability in said frameworks, also without a substantial increase in weight. Technically, the problem of the production times and high costs is not solved, as this type of expansible material requires of a skeletal member with a plurality of holes, thus requiring a prolonged period of time in order the injected foamable material to cover all of the spaces in said holes.

In the case of two non-coplanar surfaces forming a structural element, as mentioned in the U.S. Pat. No. 6,406,078 (Wycech, 2002), the insertion of an expansible structural foam fulfils various functions, among which can be mentioned: the strengthening of the structural member upon increasing the thickness of the walls, and to act as a filling material between two walls, so that, when the foam between said walls hardens, it serves as an adhering element, hardly connecting said surfaces and strengthening thus said structural member. The specific function of this type of foamable material is that the same is used as an adhesive agent instead of as a filling element with the purpose of strengthen a plastic article.

This latter function of adhesion between pieces is disclosed in a more complete manner in the U.S. Pat. No. 6,103,348 (Scharrenberg et al, 2000) wherein a molding plastic material is employed to fill out the spaces between several pieces separated apart from one another, also of different materials, in order to connect them to one another when cured, and to form a sole article. With the subject matter claimed in this patent, it is necessary to have more awaiting time in order said foamable material to fulfill its adhesive purpose.

The general concept of employ foamed plastics as filling and reinforcing materials is also applied in pieces of greater dimensions, such as, for instance, those described in U.S. Pat. No. 7,168,590 (Jones at al, 2007) for forming a toolbox lid, or in U.S. Pat. No. 6,295,787 (Lee, 2001) for forming a refrigerator insulated structure, wherein, in the same manner, the foam (thermosetting plastic) fills completely the intermediate space, forming thus a consistent insulation body. The main objective of this patent is to become an integral part of the plastic article, rather than to be an element capable of increase the strength of the product itself.

As per the character of the expansible material, several alternatives have been already commented in the above referred to documents themselves; however, there also can be found patents specifically aimed to said compounds, such as U.S. Pat. No. 6,423,755 (Allen et al, 2002), describing rigid polyurethane foams (thermosetting plastic) or U.S. Pat. No. 6,451,231 (Harrison et al, 2002), wherein the high-efficiency foam used is employed to fill up and to stiffen previously molded parts. The hardening method comprises forming the structural foam and adding strength-increasing ingredients capable also of reducing the weight and the costs.

U.S. Pat. No. 6,619,727 (Barz et al., 2003) teaches a reinforcement system for an automobile structure, with a part of the framework wherein a reinforcing epoxy foam (thermosetting plastic) is deposited; when the system is fastened to the structure, said foam expanses and hardens during the operation of the automobile assembly, thus connecting the reinforcement system to the structure. This system provides a better load distribution on the structure of the vehicle, without the addition of an excess of weight. The foam injection process is not explained at all.

In U.S. Pat. No. 5,046,434 (Breezer et al.) a pallet is described into which a thermoplastic material is introduced, similar to that employed in the pallet already produced, in order to strengthen the same and to give a complete recycling capacity thereto. In said patent the use of a thermoformed part is described to which, prior to demolding, a preform is hot overlapped. Said preform must be previously preheated and on these two overlapped parts a third thermoformed part is pressed down. As all of these parts are still hot, it is intended that a fusion be effected among said three parts and, in this manner, an increasing of the wall thickness is obtained as well as an improvement in the mechanical characteristics of the zone. The complexity and restrictions of this invention are to be found in the molding of the preform which, due to its nature, will have great restrictions on the shape and afterwards heating the same at the moment most suitably required to overlaid on the first part being then demolded.

As a conclusion, several of the above referred to patents strengthen plastic molded parts, but with thermosetting foamed materials; said materials, aside of being costly, have no the versatility of the thermoplastic materials proposed in the present invention. Furthermore, none of the above referred to patents has as the object thereof a process that improves the manufacture costs, by improving the mechanical characteristics, as it is the object of the present invention.

SUMMARY OF THE INVENTION

It is the purpose of the present invention to provide a process for making plastic products with great wall thickness, at a low cost, with a production time shorter than the structural foam process used presently. The process of the present invention allows for the production of reinforced plastic parts or products with the structure thereof strengthened, in order that their mechanical characteristics, such as the impact strength, bending strength, and other are considerably improved, their production periods of time are shorted and, at the same time, their production costs are diminished.

It is another objective of the present invention to provide a hybrid process including the injection of a foamed thermoplastic material inside specific zones in parts or products molded in conventional processes of plastic formation, such as traditional plastic injection, extrusion, extrusion-blowing, injection-blowing, thermoforming, roto-molding, and other processes.

Another objective of the present invention is to provide a hybrid process for the manufacture of strengthened plastic parts or products; wherein a smaller investment is required than that required with the conventional processes, upon combining two common processes to obtain more technical and economical advantages.

These and other objectives are obtained through the process as disclosed in the invention, referred to as a hybrid process, including the manufacture of plastic parts or products and the injection of foamed thermoplastic materials inside specific zones of said parts or products.

The hybrid process of the present invention is based on the manufacture of a plastic product by means of a process selected from an injection, extrusion, extrusion-blowing, injection-blowing, thermoforming or roto-molding processes of traditional type or any other conventional process or combination thereof, followed by injection of a thermoplastic material which, with a foaming or expanding agent added thereto, is injected within zones specifically designed for that purpose, in a plastic product.

The injection of the thermoplastic material with the foaming agent added thereto is carried out in a machine of the low-pressure injection type, inside at least a cavity in a previously molded plastic product, serving as a "mold" or container for said foamed thermoplastic in such a manner that the walls of said premolded plastic product, of usually no greater than 5.0 mm, are strengthened with thicknesses of from 6.0 mm through 12.0 mm or more; and wherein there can be obtained thicknesses of more than 20.0 mm, without the problem of a very large cooling periods of time (prolonged cycles), due to the fact that, following the injection of the foamed thermoplastic, the piece can be withdrawn from the machine and the expansion of the foamed thermoplastic as well as the cooling thereof can be effected outside the machine.

It is a necessary condition that the premolded plastic product forms at least a covered cavity with the walls thereof; said cavity being filled up with said foamed thermoplastic. To this end, the design of an orifice or a zone capable of being perforated are required, through which said foamed thermoplastic can be injected. Depending on the process used for the manufacture of the premolded product, it will be necessary that the same is formed by two or more parts in order to form a closed cavity; in certain cases, such as in blowing and roto-molding processes, it might be possible that one piece alone is forming said closed cavity.

Should said pre-molded plastic product being reinforced have a greater wall thickness wherein said reinforcement cannot be effected by means of a covered cavity, it will be necessary that close means are designed for the cavity to be injected with said foamed thermoplastic; since in contrary case said material will expand outside said part and the desired object cannot be obtained.

On the other side, when it is necessary that said pre-molded plastic product is formed by two or more parts, said foamed plastic material, further to reinforce the wall thickness, will serve also as a fastening means for the different parts conforming said product.

Therefore, it is pretended by means of the present invention that molded plastic products are obtained by strengthening the walls thereof through the injection of a foamed thermoplastic, with no need of a very large cycle time within the molding machines. An additional advantage of this process is that products can be obtained similar to those produced with low-pressure processes with a bicomponent, and without the acquisition of high-costly special machinery, and even without a need of high output volume needed to return said investments.

These conditions and other further objects will be appear in the following description and the accompanying drawings.

DETAILED DESCRIPTION OF THE INVENTION

The present invention relates to a hybrid process for producing molded plastic articles, that includes the use of one conventional molding process or a combination of said processes, having said articles their walls strengthened by means of the injection of a foamed thermoplastic material, in zones designed to that purpose.

Figure 1A:
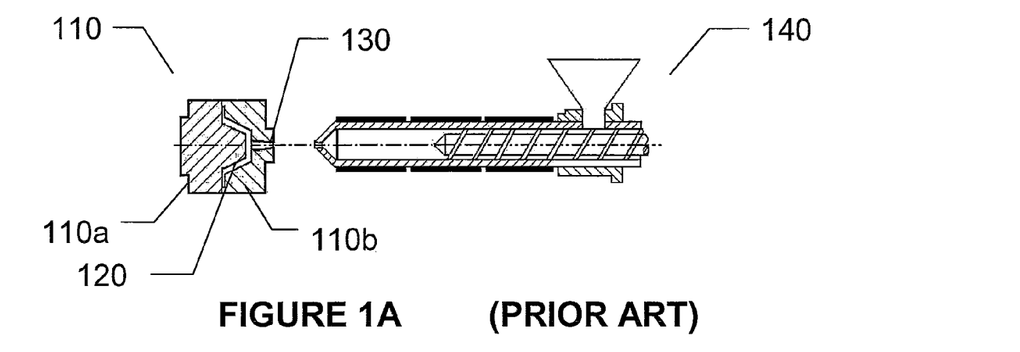
FIGS. 1A-1C show schematically, and as an example, the production of a first section of a plastic article, through a conventional injection molding process for forming an article, according to the hybrid process of the present invention.
Figure 1B:
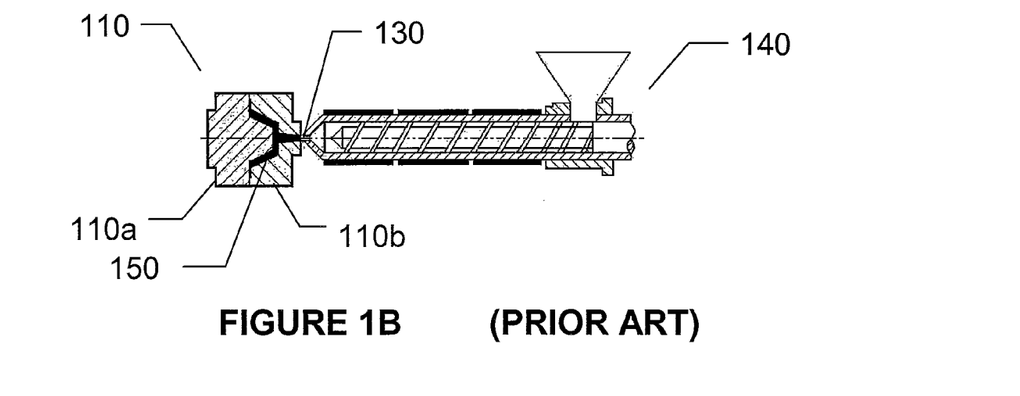
Figure 1C:
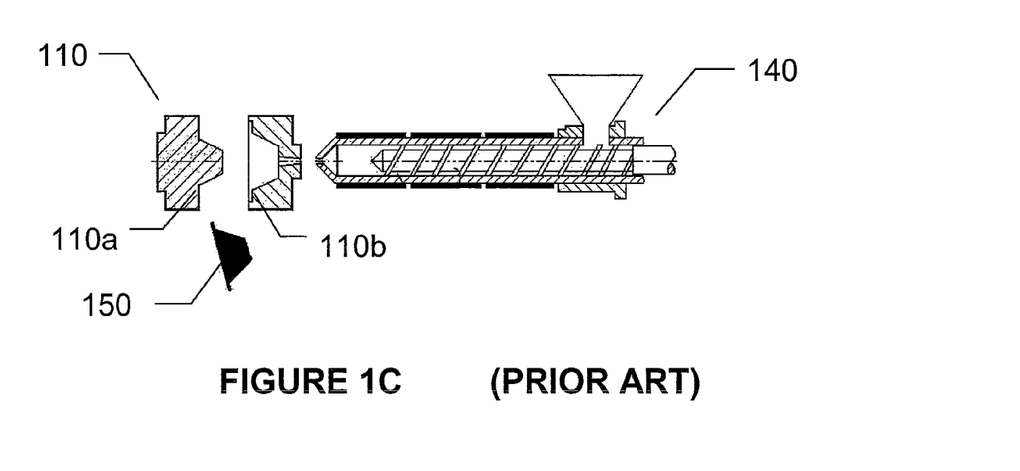
Figure 1D:
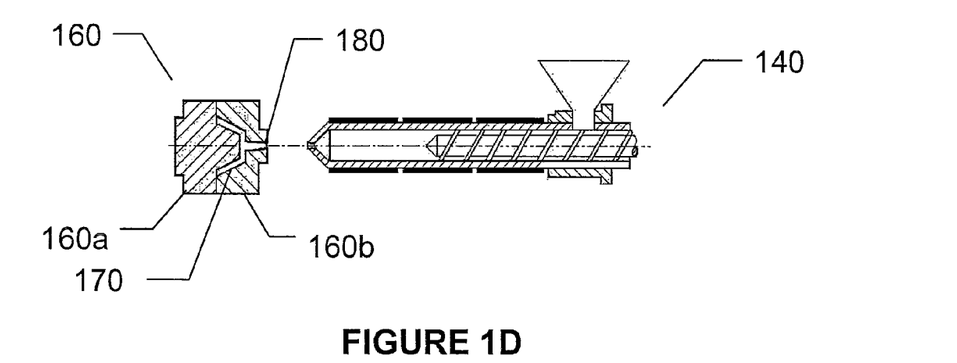
FIGS. 1D-1F show schematically and as an example, the production of a second section of a plastic article, through a conventional injection molding process for forming an article, according to the hybrid process of the present invention.
Figure 1E:
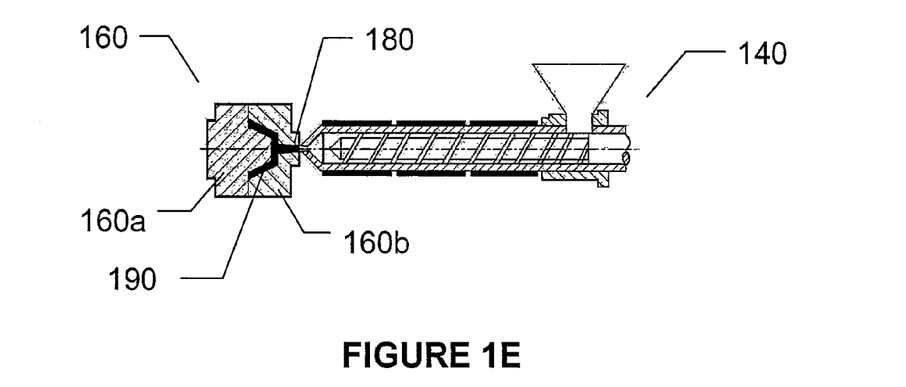
Figure 1F:
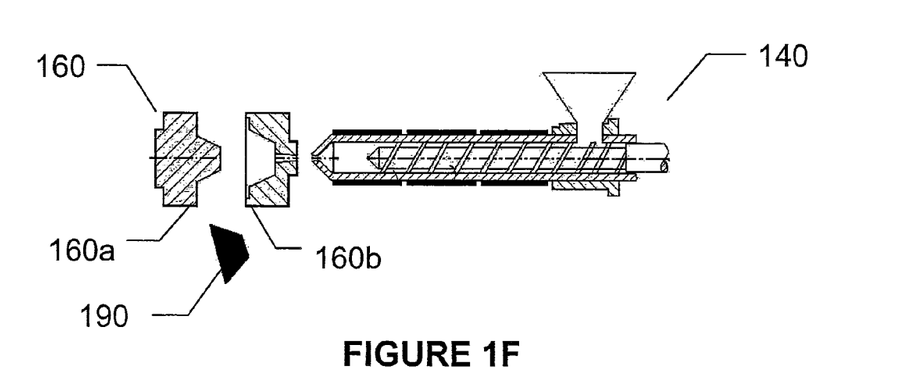
Figure 2:
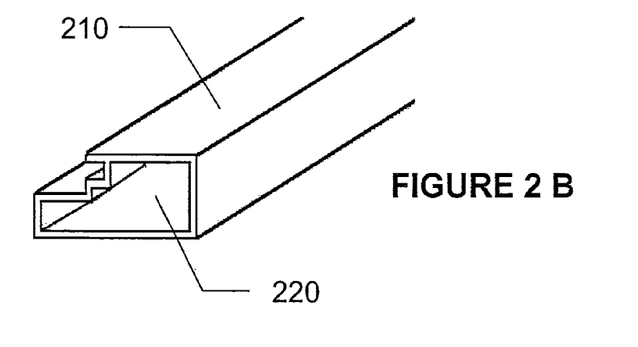
FIG. 2A shows schematically another example of the production of a plastic article through a conventional extrusion molding process.
FIG. 2B shows an article produced through the conventional extrusion molding process of FIG. 2A.
FIG. 2C shows the stage of foamable thermoplastic material injection within the article of FIG. 2B, according to the hybrid process of the present invention.
FIG. 2D shows the end product obtained according to the hybrid process of the present invention.
Figure 2A:
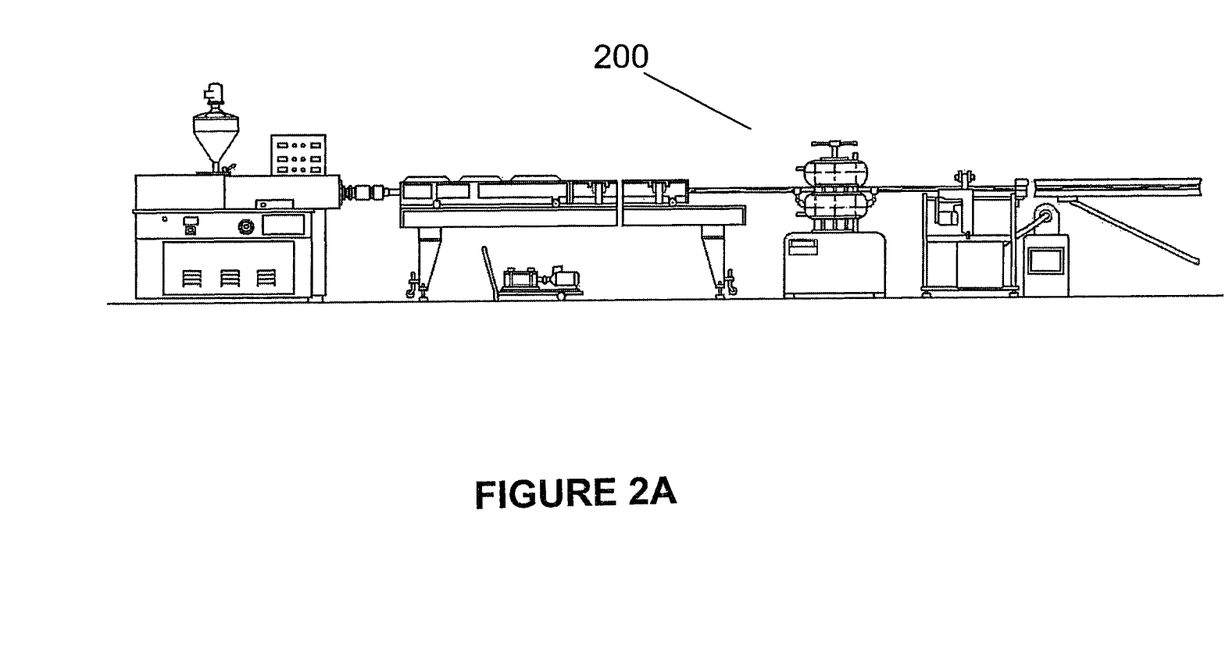
Figure 3:
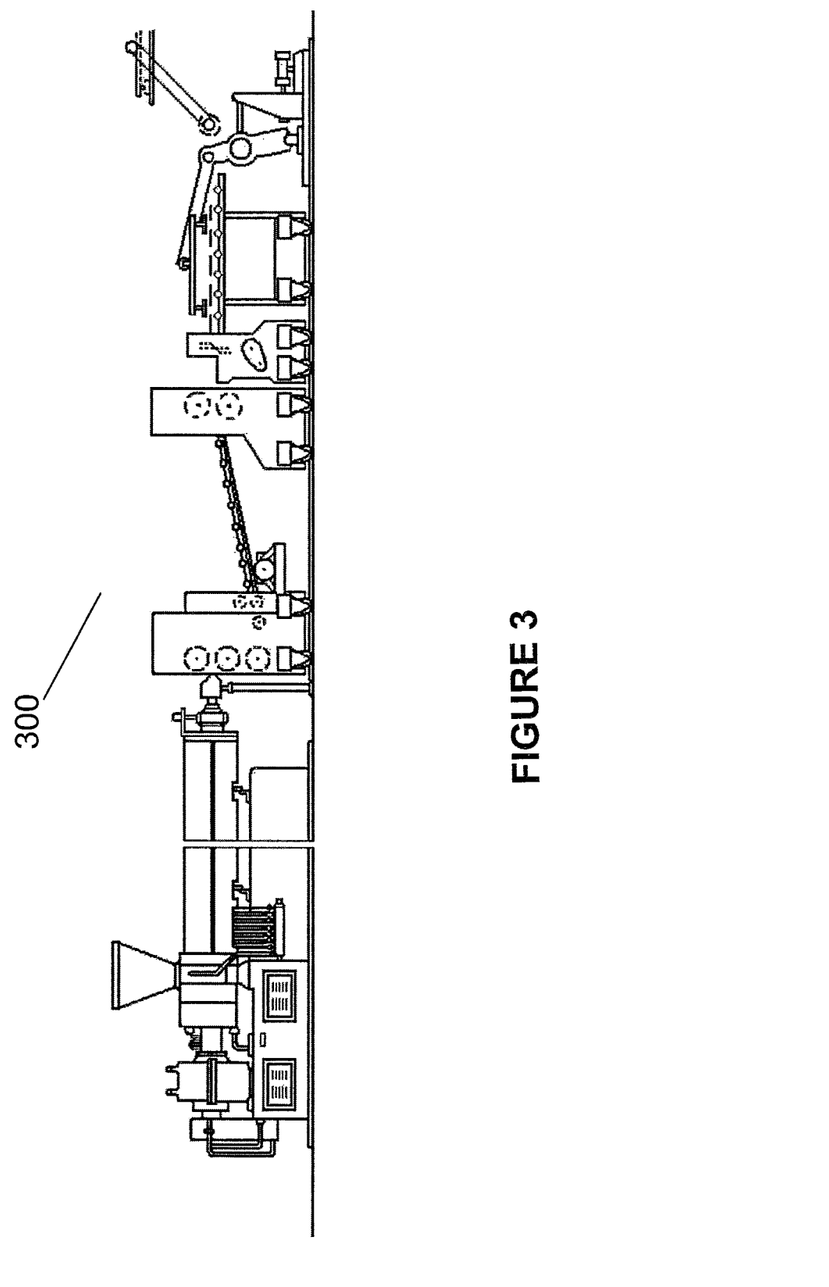
FIG. 3 shows schematically a conventional extrusion molding process of a sheet for the production of a plastic article.
Figure 4A:
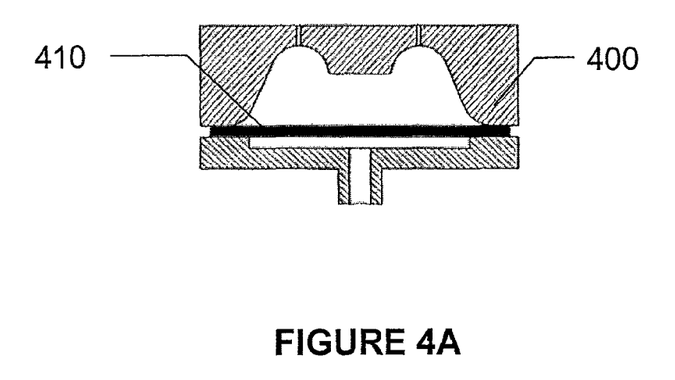
FIGS. 4A-4C show a thermoforming example of a plastic article from a sheet obtained with the process of FIG. 3.
Figure 4B:
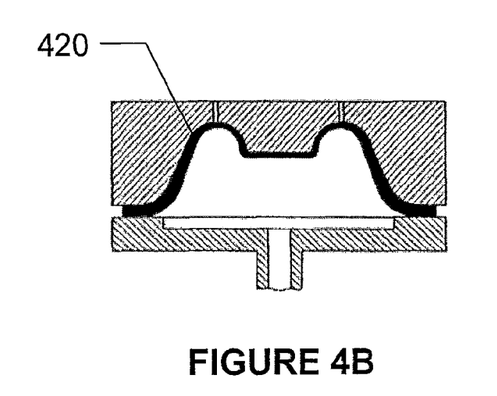
Figure 4C:
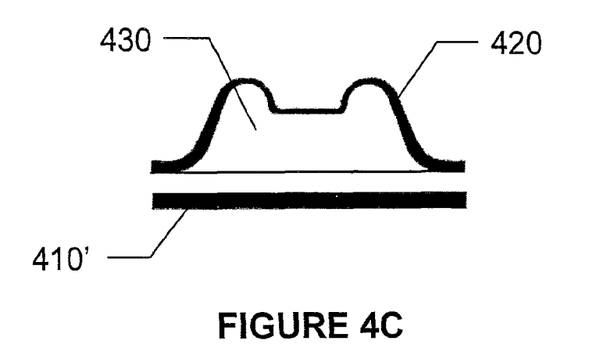
Figure 5A:
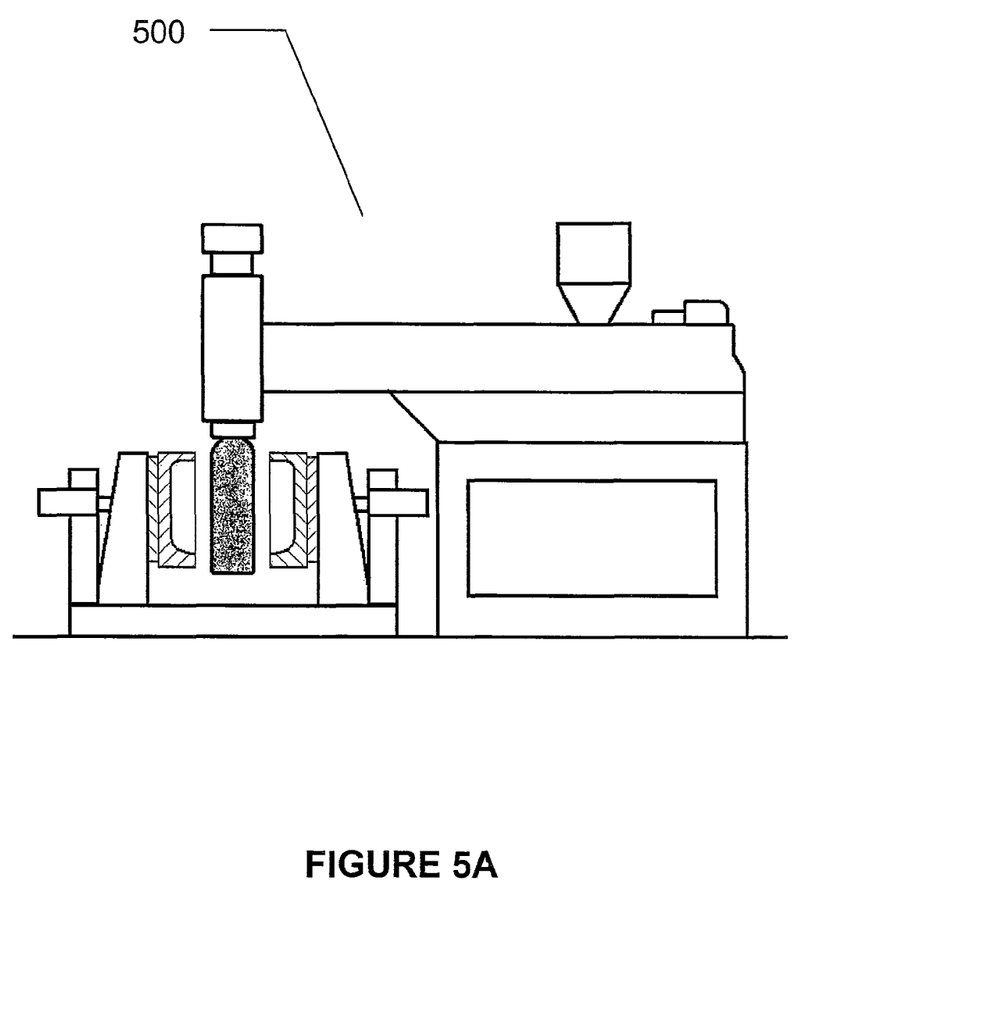
FIG. 5A shows schematically an example of the production of a plastic article through a conventional process of extrusion-blowing.
Figure 5B:
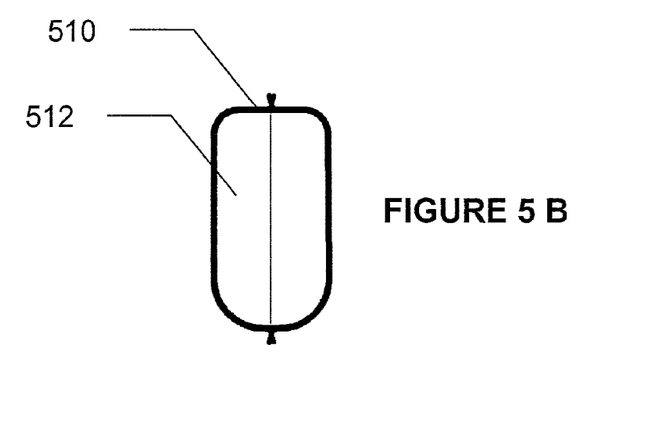
FIG. 5B shows an article obtained through the conventional process of extrusion-blowing of FIG. 5A.

Certain of the conventional processes capable of being employed according to the present invention include processes of:
- injection, as schematically illustrated in FIGS. 1A-1F;
- profile extrusion, as schematically illustrated in FIG. 2A.
- sheet extrusion combined with thermoforming, as schematically illustrated in FIGS. 3 and 4A-4C.
- extrusion-blowing, as schematically illustrated in FIGS. 5A and 5B;
- injection-blowing (no illustrated);
- roto-molding (non illustrated), and the like.

In this invention, a combination of the traditional processes for molding plastics (either thermoplastic or thermoset) with a process for injecting a structural plastic foam of thermoplastic materials, results in an hybrid process that can be used preferably in the manufacture of plastic parts with great thicknesses, wherein the strengthening of specific zones improves their mechanical characteristics.

Although it has been stated in previous paragraphs that the process of the present invention starts with the production of a plastic article, through conventional processes, such as injection, extrusion, extrusion-blowing, injection-blowing, thermoforming, roto-molding and the like, or combinations thereof, it is necessary to make clear that said article must be designed in such a manner that internal cavities are formed to be filled up with a foamable material, in order to thicken the walls thereof, or to strengthen specific zones, as well as to be provided with an orifice for the injection of a foamable material or, in the alternative, to arrange a zone in one of the walls to be perforated so as to provide for the injection of said foamable material.

The above recited processes provide each the production of plastic articles with special characteristics, such as, for instance, the thickness of the walls of the premolded plastic product, that can be of from 0.5 to 5.0 mm thickness, or thinner walls, of less than 0.5 mm; or, depending on the general characteristic of the product, several forms and models are designed according to the end product desired.

In the present invention a necessary condition is that in the premolded plastic product is formed at least a cavity covered with the walls thereof; said cavity will be filled up with said foamed thermoplastic material, and the presence of at least an orifice is required or a zone through which said foamed thermoplastic is introduced. The presence of one or more orifices or zones (hereinafter designed as "injection gates") for the injection of reinforcement foamable plastic material will depend on the shape of the article proper, as well as on the process employed in the pre-molding thereof; but in every case, at least one orifice or injection zone will be necessary as well as the formation of at least a covered cavity. In some cases, such as blowing or roto-molding processes, it is possible that one sole piece be sufficient to form said covered cavity.

The next step consists in injecting, through said injection gates in said zones or filling holes, a foamable thermoplastic material in an amount sufficient to completely fill up said filling zone or hole.

The injection of thermoplastic material added with said foaming agent is carried out with a machine of the low-pressure injection type, by injecting said thermoplastic material into a cavity through the injection gate of said article, serving said cavity as a "mold" for said foamed thermoplastic material.

When the injection stage is ended, the following stage in the process of the present invention ends when the cooling and expansion of said foamable plastic material is permitted in a stowage zone or in the warehouse.

Finally, with the process of the present invention a plastic article is obtained with the previously designed special characteristics, such as the thickness of the thin walls, with a thickness of from 0.5 to 5.0 mm; and with the capability of obtain strengthened walls with thicknesses of from 6.0 mm to 12.0 mm or more of wall thickness; and there being possible to obtain even wall thicknesses of more than 20.0 mm, without the problem of very high cooling time (long cycle), due to the fact that, after the injection of the foamed thermoplastic, the piece may be withdrawn from the machine quickly and the expansion of said foamed thermoplastic material as well as the cooling thereof can be ended outside the machine.

In case that the pre-molded plastic product being strengthened, has a greater wall thickness and cannot be produced with a covered cavity, it will be necessary to design means for closing the cavity to be injected with said foamed thermoplastic material, since, if not do so, said material will experiment its expansion outside said part, and the desired purpose cannot be reached, i. e., the production of a plastic part with an greater wall thickness and with a low molding cycle.

Moreover, when it is desired that said pre-molded plastic product is formed by two or more parts, said foamed plastic material, further to strengthen the wall thickness, also could serve as a fastening means for the different parts constituting said product.

Therefore, the wall thickness of the plastic product being manufactured represents one of the most important items to be taken into account during the molding processes, as there can be applied the principle that the smaller the wall thickness, the lower the weight, the cost and the manufacture time (shorter cycle), and, vice versa, the greater the wall thickness, the greater the weight, the cost and also the wall thickness, the time of manufacture (longer cycle), and greater the costs.

It is provided hereinafter, as an illustrative example, a description of the embodiments as illustrated in the accompanied figures, wherein conventional processes of plastic molding are employed to make a preform; and this preform is afterwards subjected to the thermoplastic injection stage, in order to obtain the thickening of the walls and/or the strengthening of zones specifically selected and designed to that end.

In a first embodiment, and with reference to FIGS. 1A-1H, a hybrid process of this invention is illustrated, wherein said plastic article is initially formed through a conventional injection molding process.

FIGS. 1A-1C shown a first two-pieces (110a) and (110b) conventional mold (110) which pieces when assembled, form a cavity (120) wherein melted plastic material is injected through a canal (130), by employing an injection equipment (140), as shown in FIG. 1B, in order to produce a first section (150) of an article.

FIGS. 1D-1F illustrate a second two-pieces (160a) and (160b) conventional mold (160) which pieces when assembled form a cavity (170) wherein melted plastic material is injected through a canal (180), by employing an injection equipment (140), as shown in FIG. 1E, in order to produce a second section (190) of an article.

Figure 1G:
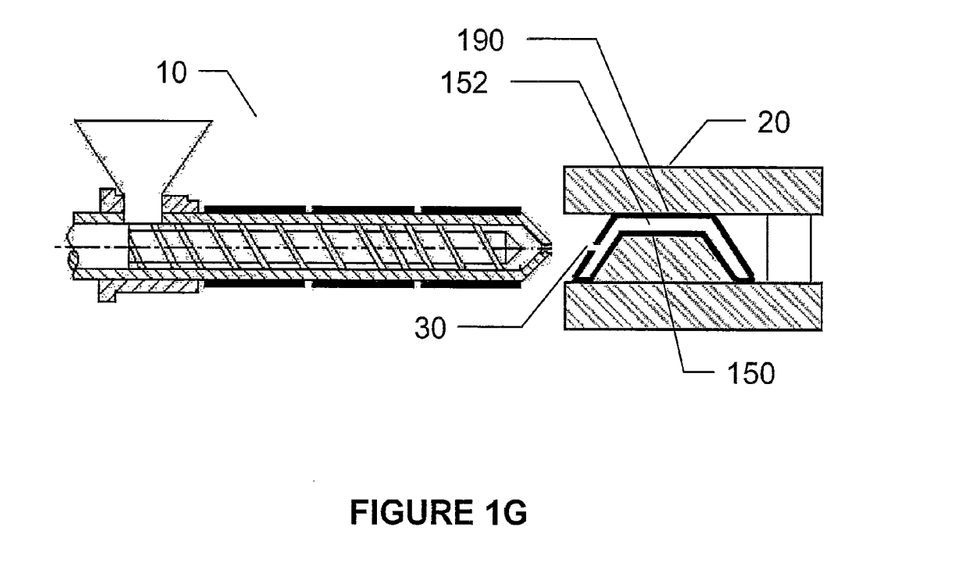
FIG. 1G shows the injection of a foamable thermoplastic material, according to the hybrid process of the present invention, inside the plastic product formed by the sections of the preceding figures.
Figure 1H:
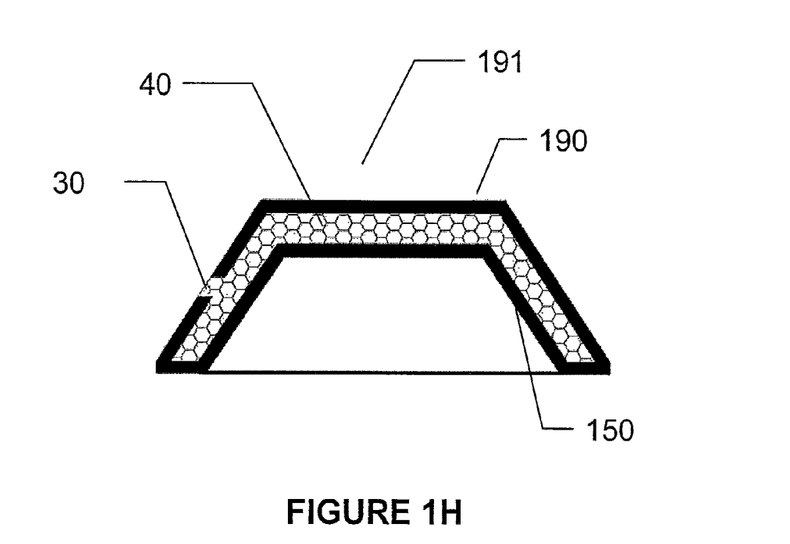
FIG. 1H shows the plastic article produced through the hybrid injection molding process of the present invention.

FIG. 1G shows schematically the stage of melted thermoplastic injection by means of an injection equipment (10) within the hole (152) formed when said two sections (150) and (190), molded according to FIGS. 1A-1F are assembled; with said sections being fastened together by means of a press (20). Said thermoplastic injection is carried out through an injection gate (30), illustrated as an orifice. Once injected within said thermoplastic material, the foaming material (40) expands to fill up said hole (152) resulting in the product as shown in FIG. 1H. Said thermoplastic with foaming material (40), further to fill up the hollow between said sections (150)

and (190) serves to thicken and strengthen the same, as well as a means to keep them together, bringing also to the product both stability and strength.

In a second embodiment, and making reference to FIGS. 2A-2D, a hybrid process of the invention is illustrated, wherein said plastic article is initially formed through a conventional extrusion molding process.

In FIG. 2A a conventional equipment (200) for extrusion molding is represented schematically, by means of which a profile (210) can be obtained, as illustrated in FIG. 2B, wherein it can be seen that a hollow chamber (220) is formed.

The thermoplastic material injection within said profile (210) is made through the injection gate (30) shown in this illustration as an orifice. Once injected, the thermoplastic with foaming material (240) expands up to fill up said hole (220) giving as a result the product shown in FIG. 2D, wherein said thermoplastic with foaming material (240), further to filling the hole between the profile (210) walls, also serves as a thickener and strengthener means.

In a third embodiment, and with reference to FIGS. 3 and 4A-4E, a hybrid process of this invention is illustrated, wherein a plastic sheet (300) is initially formed through a conventional process of sheet extrusion molding, and thereafter, said sheet is employed in forming an article by means of a thermoforming process (FIGS. 4A-4E).

In FIGS. 4A-4C a conventional process of thermoforming molding is represented schematically, wherein a sheet (410) obtained through a process (300) is introduced into a mold (400) by means of which a section (420) can be obtained with the form of said mold (400); and wherein said section (420) will be connected to another section (a sheet) (410') to form a product, such as illustrated in FIG. 4C, wherein it can be seen that a hollow chamber (430) is formed.

Figure 4D:
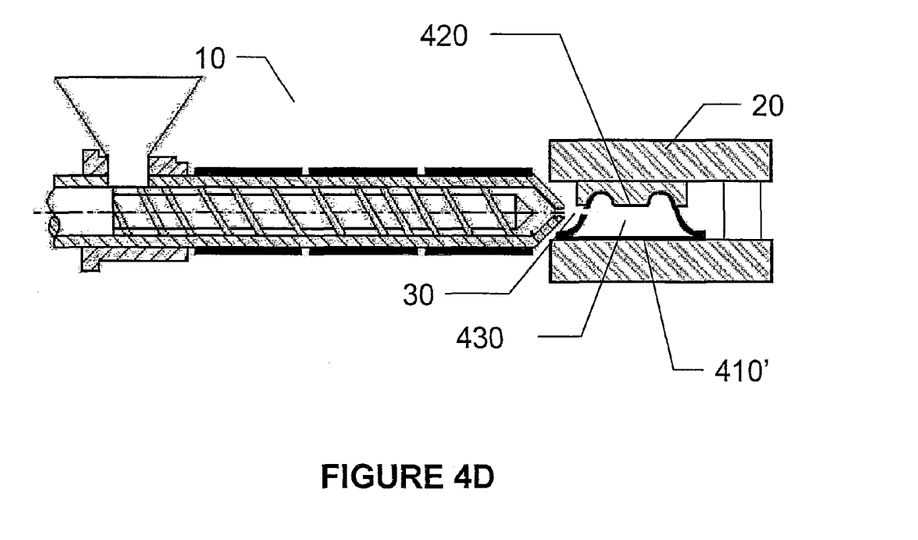
FIG. 4D shows the stage of foamable thermoplastic material injection inside the article of FIG. 4C, according to the hybrid process of the present invention.
Figure 4E:
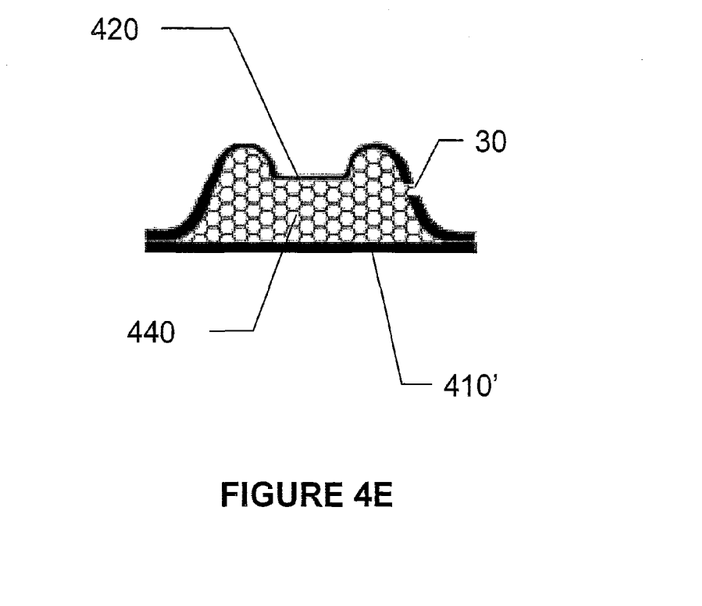
FIG. 4E shows the end product obtained through thermoforming of a sheet according to the hybrid process of the present invention.

The injection of thermoplastic with foaming material within said hole (430) is made through the injection gate (30) shown in this illustration as an orifice. Once injected, said thermoplastic material (440) expands up to fill up the hole (430) resulting in a product as shown in FIG. 4E, wherein said thermoplastic material (440), further to fill up the hole between the sections (410') and (420) of the product, also serves as a thickener and strengthener means.

In a fourth embodiment, and with reference to FIGS. 5A-5D, a hybrid process of this invention is illustrated, wherein a plastic perform (510) is initially formed; being said perform substantially hollow (512), through a conventional process of extrusion-blowing molding process (500).

Figure 5C:
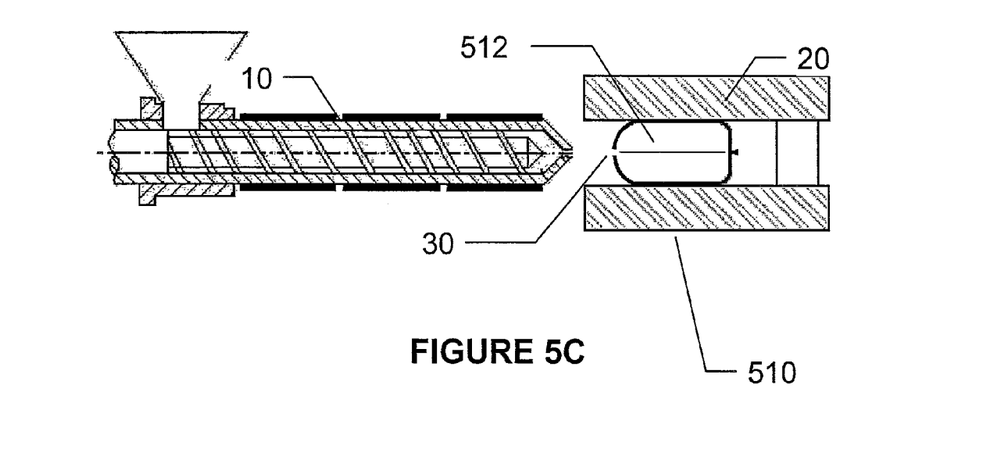
FIG. 5C shows the stage of a foamable thermoplastic material injection within the article of FIG. 5B, according to the hybrid process of the present invention.
Figure 5D:
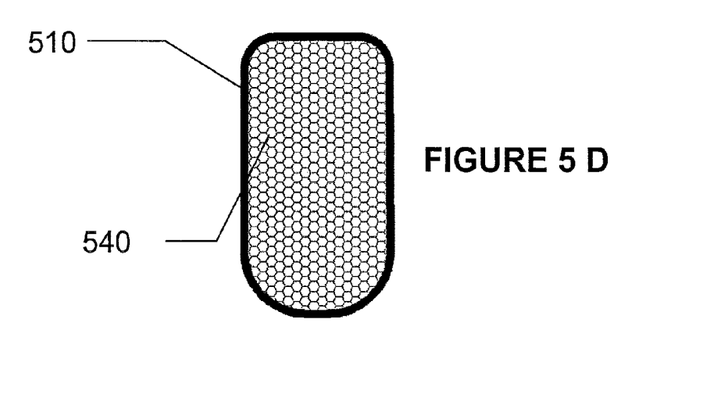
FIG. 5D shows the end product obtained through extrusion-foaming according to the hybrid process of the present invention.

The thermoplastic injection within said hole (512) is effected through the injection gate (30) shown in this illustration as an orifice. Once injected, the thermoplastic with foaming material (540) expands to fill up said hole (512) whereby the product shown in FIG. 5D is obtained, wherein said thermoplastic material (540), further to fill up said hole (512), also serves as a thickener and strengthener means.

The hybrid process of this invention is comprised of the following stages:

1. Design of the plastic article, wherein said design must take into account that the article or product must include at least a cavity or hollow zone to be filled out with said thermoplastic strengthening material; being defined said cavity by the walls proper of said article, by the inner walls designed to that end, or by means for holding the foamed material to be injected; and wherein said article or product must be provided with at least an injection gate; being this latter either an orifice to receive a nozzle end of the equipment for the injection of said foamable thermoplastic material, or a wall capable of being drilled with the nozzle end for the injection of said foamable thermoplastic material.
2. Premolding, to form said plastic article designed in the previous stage, by means of a conventional molding process.
3. Injecting a thermoplastic material with an expanding or foaming agent, by means of a low-pressure injection equipment, through said at least one injection gate or injection zone within said at least one cavity or hollow zone, as previously designed.
4. Expansion: Withdrawing the plastic product or article from the low-pressure injection machine, and allow for the expansion of said thermoplastic foamed material; and
5. Cooling the manufactured product in a storage zone or warehouse.

It will be apparent for those skilled in the art that the process of this invention can be carried out with several modifications or variations, and that can be applied by a number of products requiring of increased wall thickness, and at the same time, maintaining low costs and low production times; and that the principles of this invention can be employed therefor, without falling out from the spirit and scope thereof. Therefore, it is to be understand that all of the above described and illustrated has merely an illustrative and no limitative character.

The invention claimed is:

1. A process for producing plastic molded articles with thickened and strengthened walls, comprising the steps of:
   a) designing a plastic article having at least one cavity or hollow zone to be filled out with strengthening thermoplastic material, and wherein said article is provided with at least one injection gate or an injection zone;
   b) premolding the plastic article designed in the previous step as at least two separate molded plastic pieces through a molding process, wherein at least one of the at least two separate molded plastic pieces is premolded to at least partially define the at least one cavity or hollow zone therein;
   c) after the premolding step b), assembling the at least two separate molded plastic pieces to define the at least one cavity or hollow zone of the plastic article between the at least two separate molded plastic pieces;
   d) after the assembling step c), injecting a thermoplastic material with an expanding or foaming agent, by low-pressure injection equipment, through said at least one injection gate or injection zone, into said at least one cavity or hollow zone of the article previously molded in step b) to completely fill said at least one cavity or hollow zone with the foamed or expanded thermoplastic material;
   e) withdrawing the plastic article from the low-pressure injection equipment, and providing for the expansion of said foamed or expanded thermoplastic material;
   f) after the withdrawing step e), fastening the at least two separate molded plastic pieces together with the foamed or expanded thermoplastic material to form the plastic article; and
   g) carrying out a cooling down of the withdrawn article from an elevated temperature resulting from the injecting step in a storage zone or warehouse, wherein the foamed or expanded thermoplastic material serves to fasten together various sections forming the article, wherein the at least one cavity or hollow zone is covered to prevent the foamed or expanded thermoplastic material to be injected from running out of the at least one cavity or hollow zone, and wherein the plastic article is strengthened in the at least one cavity or hollow zone by the foamed or expanded thermoplastic material.

2. The process according to claim 1, wherein in the step of designing the plastic article, at least one cavity or hollow zone is designed in such a location as to provide greater hardness or strength during use of the article.

3. The process according to claim 2, wherein the cavity or hollow zone is defined by the walls of said article.

4. The process according to claim 1, wherein in the step of premolding the plastic article, articles are obtained with special characteristics, such as the geometry and the wall thickness of said article.

5. The process according to claim 4, wherein the walls of the premolded plastic article are of a thickness of from 0.5 to 5.0 mm.

6. The process according to claim 4, wherein the walls of the premolded plastic article are of a thickness lower than 0.5 mm.

7. The process according to claim 1, wherein the process for molding the plastic article is selected from the group comprising: injection, extrusion, extrusion-blowing; injection-blowing, thermoforming, roto-molding, or a combination of any of them.

8. The process according to claim 1, wherein the step of injecting said foamed thermoplastic material is carried out through said at least one injection gate or injection zone within said at least one cavity or hollow zone of the article previously molded.

9. The process according to claim 8, wherein the injection gate is an orifice to receive a nozzle end of the equipment for the injection of the foamable thermoplastic material.

10. The process according to claim 8, wherein the injection gate is a zone with a wall capable of being perforated by a nozzle end for the injection of said foamable thermoplastic material.

11. The process according to claim 1, wherein refilling wall thicknesses of from 6.0 mm through 12.0 mm are obtained by said foamed thermoplastic material injected.

12. The process according to claim 1, wherein a wall thickness of the plastic article, following the injection of the foamed thermoplastic, is greater than 7.0 mm.

13. The process according to claim 1, wherein the expansion and cooling steps for the foamed thermoplastic filling of the article are carried out outside the low-pressure injection equipment, in the storage zone or the warehouse.

14. A process for producing plastic molded articles, comprising the steps of: premolding a plastic article having at least one cavity or hollow zone and at least one injection gate or an injection zone, wherein the plastic article is premolded as at least two separate molded plastic pieces and at least one of the at least two separate plastic pieces is premolded to at least partially define the at least one cavity or hollow zone therein;

after the premolding step, assembling the at least two separate molded plastic pieces to define the at least one cavity or hollow zone of the plastic article between the at least two separate molded plastic pieces;

after the assembling step, injecting a thermoplastic material with an expanding or foaming agent, by low-pressure injection equipment, through said at least one injection gate or injection zone, into said at least one cavity or hollow zone of the premolded plastic article to completely fill said at least one cavity or hollow zone with the foamed or expanded thermoplastic material;

withdrawing the plastic article from the low-pressure injection equipment;

after the withdrawing step, fastening the at least two separate molded plastic pieces together with the foamed or expanded thermoplastic material to form the plastic article; and carrying out a cooling down of the withdrawn article from an elevated temperature resulting from the injecting step, wherein the at least one cavity or hollow zone is covered to prevent the foamed or expanded thermoplastic material to be injected from running out of the at least one cavity or hollow zone, and wherein the plastic article is strengthened in the at least one cavity or hollow zone by the foamed or expanded thermoplastic material.

15. The process according to claim 1, wherein the at least two separate molded plastic pieces are assembled by pressing the pieces together.

16. The process according to claim 1, wherein the at least two separate molded plastic pieces are assembled in a press that does not surround the at least two separate molded plastic pieces.

17. The process according to claim 1, wherein the at least two separate molded plastic pieces are formed without any interlocking portions for retaining the at least two separate molded plastic pieces in an assembled state.

18. The process according to claim 1, wherein the at least two separate molded plastic pieces are formed from a thermoplastic material.

* * * * *